June 20, 1967 F. M. WOOD ET AL 3,327,206
DEVICE FOR INSPECTING UPSET AREA OF TUBULAR MEMBERS
Filed April 29, 1964 4 Sheets-Sheet 1
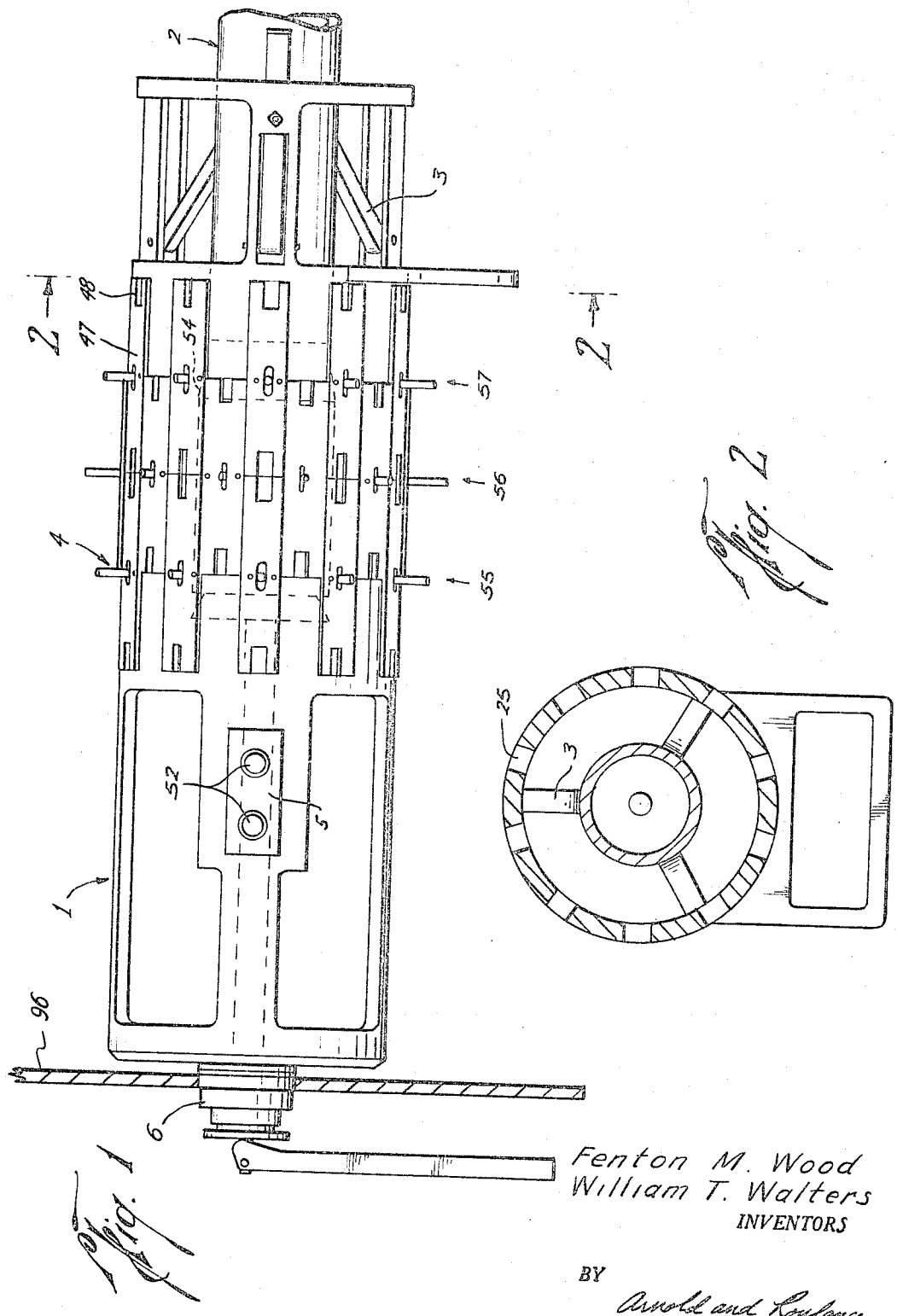
Fenton M. Wood
William T. Walters
INVENTORS
BY
*Arnold and Roylance*
ATTORNEYS

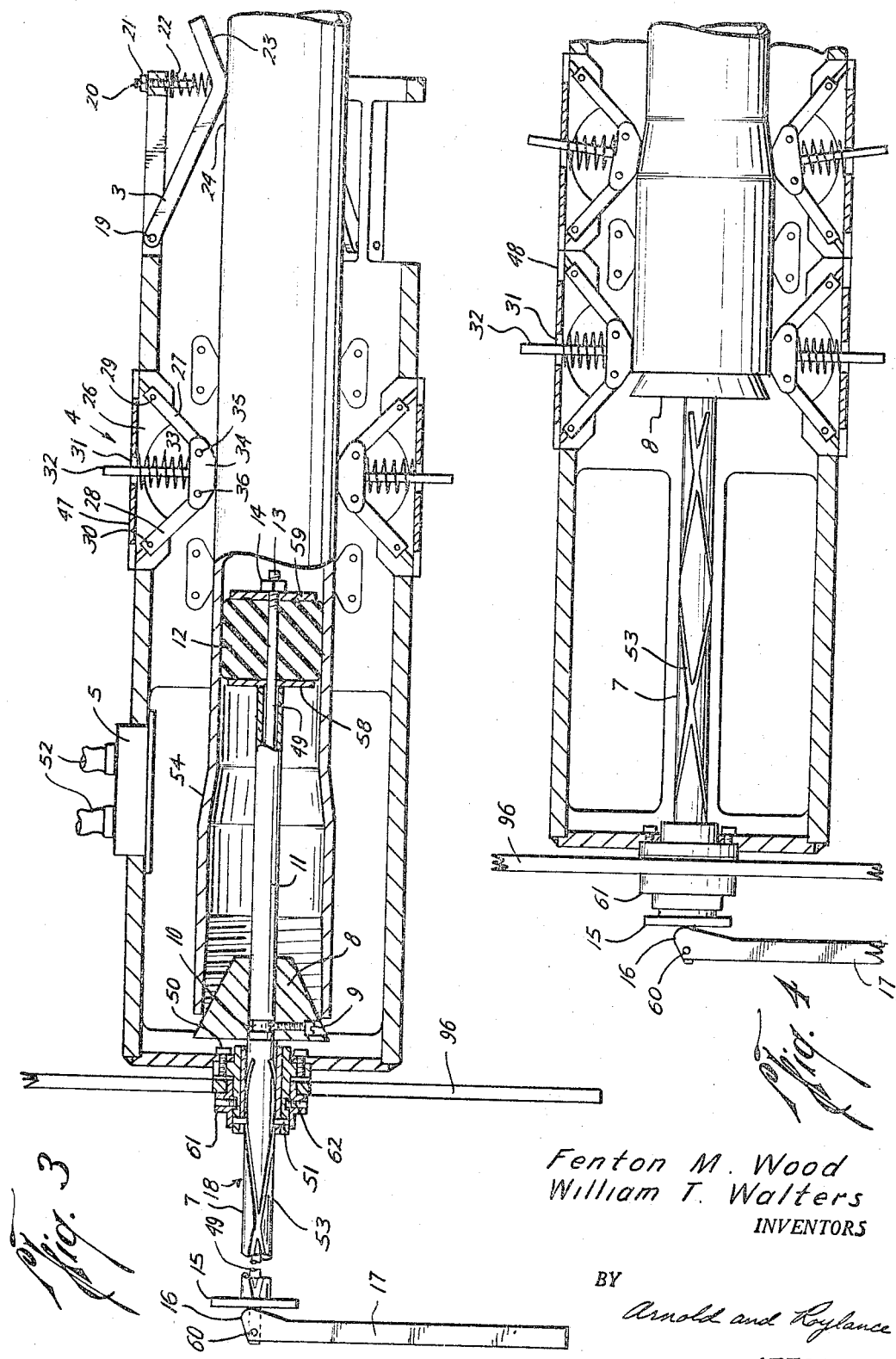

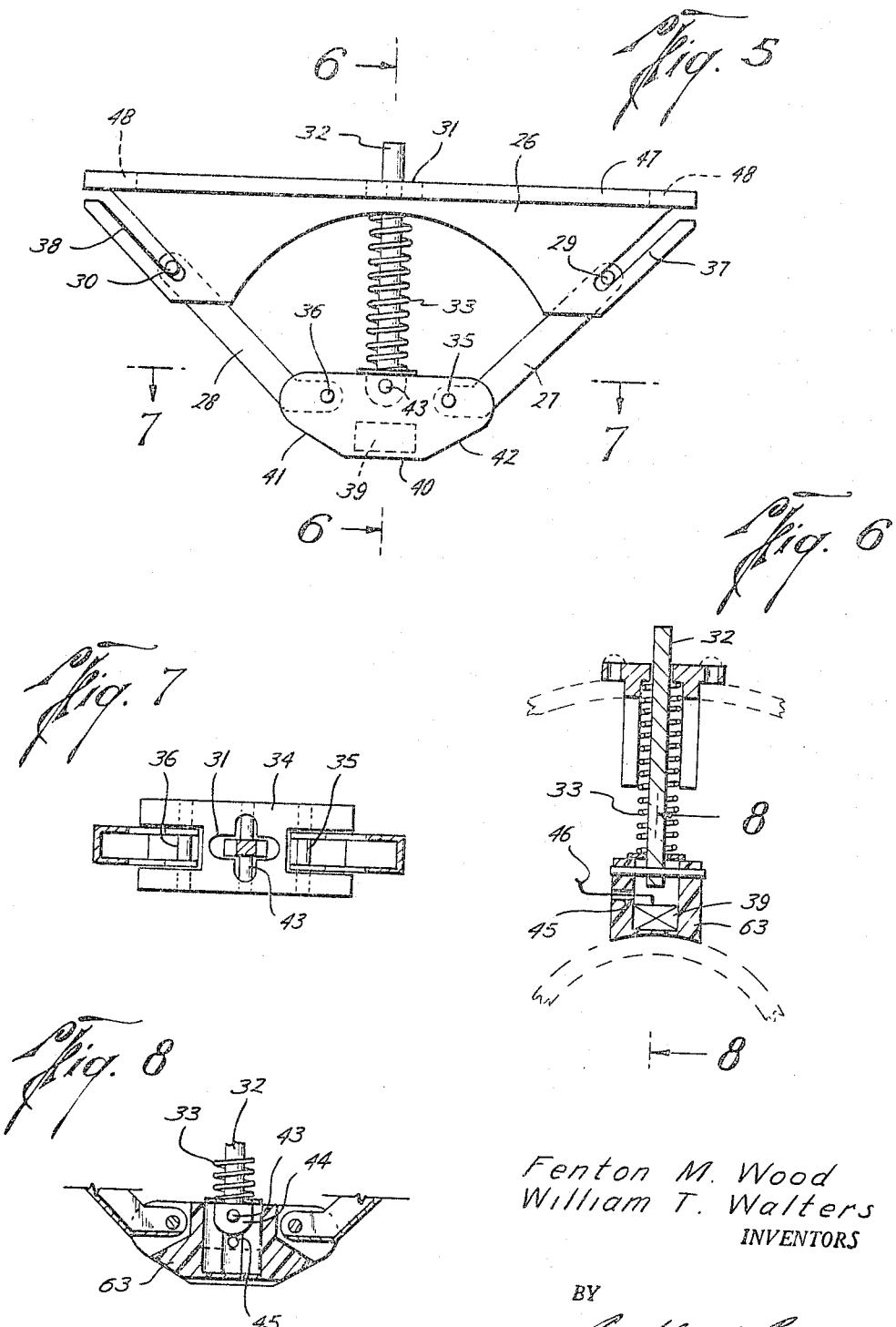

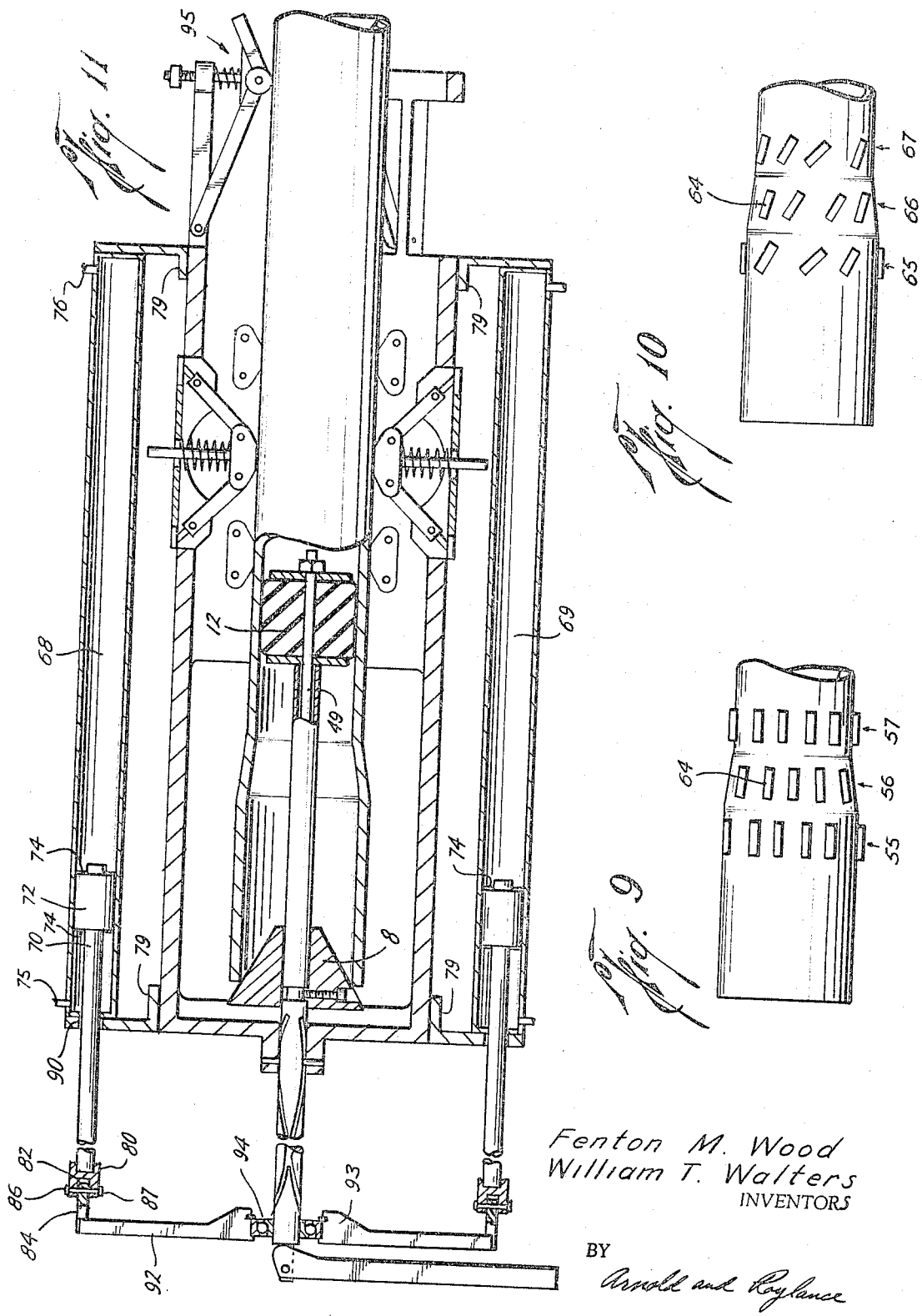

United States Patent Office 3,327,206
Patented June 20, 1967

3,327,206
DEVICE FOR INSPECTING UPSET AREA OF TUBULAR MEMBERS
Fenton M. Wood, Sugarland, and William T. Walters, Houston, Tex., assignors to American Machine and Foundry Company, New York, N.Y., a corporation of New Jersey
Filed Apr. 29, 1964, Ser. No. 363,559
6 Claims. (Cl. 324—37)

This invention relates to the detection of flaws in tubular pipe sections and more particular to an improved assembly for tracking the surface of the upset end of a tubular pipe with coils sensitive to changes in magnetic flux density caused by flaws.

It is common procedure in the inspection of pipe, such as pipe used in the oil and gas industry for transporting oil field products, to magnetize or otherwise create magnetic fields in the inspected pipe. Such fields in relatively flawless pipe are uniform; however, in pipes having flaws such as pits, inclusions, laminations, and the like such fields become distorted and form the basis for flaw detection.

A convenient means used to detect variation in magnetic flux density has been a small search coil which moves at a uniform rate with respect to the surface of the pipe. Because of the usual long lengths of pipes that are normally inspected it has been found more expedient to secure the coil, or coils as they are often used in multiples, and move the inspected pipe past at a uniform rate parallel to the axis of the pipe.

Although satisfactory for pipe of uniform external diameter, such arrangements have not proved successful with pipes of varying diameter, such as the upset end of a pipe. In the past the upset ends have been either very laboriously inspected by hand or not at all at the great risk of missing a significant number of flaws. The need for accurately inspecting such upset ends is extremely important since it is true that in the pipe-making industry today that there are as many flaws in the upset area of pipe as occur in the entire remainder of the pipe.

Another problem that is occasioned by the conventional method described above for moving the surface of the pipe with respect to the search coils has been the frequent failure of detecting all flaws with a single passing movement. For instance, flaws aligned parallel to the axis of pipe often go undetected, since they do not disturb the field in a direction that is being sensed. Another pass in a direction 90 degrees with respect to the first pass is necessary to assure the detection of all flaws.

Also, if back-up inspection is desired, it has been necessary to make a new pass with the pipe indexed to a new position.

All of this has caused uncertainty, as well as the unnecessary consumption of time.

The present invention cures these problems and others in one single, easy-to-use mechanical assembly.

Therefore, what is described below is essentially an apparatus for inspecting a tubular pipe, particularly the upset area of a pipe, for both longitudinally and transversely oriented flaws, comprising essentially the following elements:

a cage adapted to receive a plurality of a series of rings of shoes comprising one or more search coils, the cage being large enough in diameter to move freely about the inspected area of the pipe, a plurality of rings of shoes attached to the cage so that each ring has its shoes spaced at intervals around the entire circumference of the pipe so that each shoe projects inwardly from its position in the cage to ride on the surface of the pipe and float freely with the contours, such as the upset area, a rod assembly for locating the inspected pipe in a central position, the rod extending from the center of the pipe and having a helical groove, a helical groove tracking assembly attached to the cage so that when the cage is moved longitudinal with respect to the pipe the cage moves in a helical manner, and a moving system for moving the cage at a uniform rate with respect to the pipe.

A detail description of the invention can better be understood by referring to the drawings, which form a part of the specification, and wherein FIGURE 1 is a side elevation view of an illustrated embodiment of the invention.

FIGURE 2 is a section view taken at line 2—2 of FIG. 1.

FIGURE 3 is partly a side elevation and partly a section view of an illustrated embodiment with part of the structure broken away to reveal some of the internal components.

FIGURE 4 is an enlarged side section of part of an illustrated embodiment inspecting the upset area of a tubular pipe.

FIGURE 5 is a side elevation view of one of the shoe assemblies of an illustrated embodiment.

FIGURE 6 is a section view taken at line 6—6 of FIG. 5.

FIGURE 7 is a section view taken at line 7—7 of FIG. 5.

FIGURE 8 is a section view taken at line 8—8 of FIG. 6.

FIGURE 9 is a schematic view of the shoes in the illustrated embodiment shown in FIGS. 1-8 with respect to the upset area of a measured pipe.

FIGURE 10 is a schematic view of the shoes in another embodiment of the invention.

FIGURE 11 is a longitudinal section of another embodiment of the invention.

The embodiment of this invention shown in FIGS. 1-8 is shown schematically in FIG. 9. The shoes 64 are shown surrounding the portion of the measured pipe and conforming to the contours thereof. The apparatus described below achieves this conformity.

Cage 1 of an illustrated embodiment of this invention is best shown in FIGS. 1 and 2. FIG. 1 shows cage 1 retracted to its furtherest most left position. Tubular pipe 2 that is measured by the apparatus is shown inserted in the right end of cage 1 so that upset area 54 is actually within the cage, as shown by the dotted lines.

Pipe 2 is centered within cage 1 by rod assembly 18, as described below, and by centering fixtures 3, attached to the cage.

Three equally spaced fixtures are illustrated in FIG. 2, the geometry being naturally suited to align the inserted pipe within the center of the cage.

The attachment of one embodiment of a centering fixture 3 is best shown in FIG. 3, where it is seen that the fixture itself is made from bar stock of rectangular cross section and shaped to form an elbow at approximately a 150-degree angle. The fixture is attached to cage 1 by pivot point 19 so that outside surface 23 of the fixture extends inwardly from the cage to rest on surface 24 of the pipe to be measured.

A rod 20 attached to the cage via nut 21 is positioned essentially opposite the elbow formed in centering fixture 3. Rod 20 is short enough in length to permit the thickest pipe member with which the device is to operate to pass within the radial limits of the fixture movement.

Coil spring 22 is placed over the internally projecting end of rod 20 so as to extend between the inside surface of the cage and the inside of the elbow in fixture 3. This spring biases surface 23 to the surface 24 of the measured pipe 2 in centering and holding position.

An alternate centering fixture embodiment 95 is shown in FIG. 11, where a rotating wheel is shown instead of an elbow bend, riding on the surface of the measured pipe.

With the pipe in position, the shoe assemblies 4 inserted in shoe slots 25 in cage 1 extend to a position of contact with the surface of the pipe 2, as shown in FIGS. 3 and 4. There are three rings of shoe assemblies, viz. first ring 55, second ring 56, and third ring 57, that are illustrated, although it is readily apparent that additional or fewer rings might be preferred in a particular inspection situation.

Each of the three rings, 55, 56, and 57, have their shoe assemblies mounted at uniformly spaced intervals around the circumference of the cage. In the illustrations, ten shoe assemblies 4 are shown in a ring, although any convenient number may be used. For ease of assembly and manufacture, shoe slots 25, shown in FIG. 2, for the ring 55 shoe assemblies are placed respectively adjacent longitudinally along the surface of the cage with shoe slots 25 for the shoe assemblies of ring 57. The shoe slots 25 for ring 56 are located also at an equal number of spaced intervals around the circumference of the cage, but interspersed in the spaces of the shoe assemblies in rings 55 and 57. By this staggered spacing arrangement it is possible to place shoe assemblies closer together along the longitudinal axis and around the circumference of the cage than if the respective shoe assemblies in all three rings were placed along respective longitudinal lines around the circumference.

As finally assembled it will be seen that the rings of shoe assemblies are located at evenly spaced intervals along the longitudinal axis of the cage, i.e., there is equal spacing between ring 55 and 56 and between ring 56 and 57.

Accommodation for the electrical conductors connected to the shoe assemblies, as explained below, is also made in cage 1. Mounting plate 5 is illustrated with two connectors 52, although depending on the number of conductors to be connected, one or more such connectors may be used. The mounting plate may be made detachable by any common mounting means for ease of assembly and servicing.

In addition to the centering fixtures 3, described above, rod assembly 18 also centers the pipe to be measured in the center of the cage.

As is best shown in FIG. 3, the rod assembly is comprised of a helically grooved rod end 7 and an internally projecting rod section 11. The pipe to be measured is slipped over this internal rod section so that the end of the section is well within the pipe. A conical alignment block 8 secured to section 11 at recess 10 ensures that the pipe will center about the section. The alignment block is secured via a machine screw 9 inserted in the block and engaging the recess. The head of the machine screw is counter sunk into the block so that there will be no danger of scarring the pipe or interfering with the centering function of the block.

Running through the length of the rod assembly 18 is an internal rod 49 that extends beyond the end of internal rod section 11 inside the pipe. Slipped over internal rod 49 are compression plate 58, compliant packing 12, and compression plate 59. The hole in the center of compression plate 58 is small enough to prevent the plate from slipping over rod section 11.

In a radial direction away from the axis of the pipe, the compliant material extends beyond the limits of the compression plates.

Internal rod 49 is threaded at end 13 to receive holding nut 14. At the opposite end of internal rod 49 from threaded end 13 is attached a lever 17 at pivot point 60. At the end of lever 17 surrounding pivot point 60 is a cam surface 16 that engages a flat surface plate 15, welded or otherwise affixed to helically-grooved rod end 7, but not to internal rod 49.

To secure rod assembly 18 to pipe 2 after it has been centered by conical alignment block 8, lever 17 is moved to force cam surface 16 against flat surface plate 15. This action causes internal rod 49 to move in a left longitudinal direction (as shown in the drawings). When the rod moves longitudinal, compression plate 59 is moved closer to plate 58, thereby expanding the compliant material 12 radially against the inside surface of the pipe.

It is apparent that to release the pipe, it is only necessary to move lever 17 so that cam surface 16 no longer brings pressure to bear on flat surface plate 15. This allows compliant material 12 to shrink away from the inside surface of the pipe, thereby releasing the pipe from rod assembly 18.

It should be noted that the pipe, when held in the center position within the cage, is held at three points, viz. at the point of contact with external centering fixtures 3, at the point where compliant material 12 makes contact within the center of the pipe, and at the edge of the pipe where conical alignment block 8 makes contact.

Rod assembly 18 is itself centered within cage via groove tracking unit 6. This unit is affixed to the cage at the extreme left end of the cage as illustrated by bolts 50. The unit comprises an internal bearing surface that rides the surface of helically grooved rod end 7 forming a center guide for the movement of the rod assembly.

Depending on the desired path of rotation, i.e., generally helical in a clockwise direction or in a counterclockwise direction, a groove-tracking pin 51 is inserted in one of two accommodating openings in the bearing surface of groove tracking unit 6. The pin 51 is held in position by a sleeve 61, which is slipped over the outside of a projection of groove tracking unit 6, and secured by holding pins 62 inserted in internally threaded hole in sleeve 61 and the projection of the tracking unit.

The thirty illustrated shoe assemblies 4 are all essentially identical and provide an easy and convenient method of moving the detecting search coils over the surface of the exterior of the pipe.

The shoe assembly is attached to cage 1 in an appropriate shoe slot 25 by means of machine screws which attach shoe assembly mounting plate 47 to the cage adjacent to the slot. This is shown best in FIG. 6 where it is apparent that slot 25 is large enough to allow the bulk of the shoe assembly 4 to be inserted through the slot, but small enough to provide a mounting surface for the shoe assembly mounting plate 47.

Shoe 34 is attached to shoe mounting block 26 via two legs 27 and 28 secured at pivot points 29 and 30. The shoe then is secured to the legs at pivot points 35 and 36. All four of these pivot points provide a journal joint to allow freedom of movement in a plane passing through the longitudinal axis of the pipe.

Rod 32 is attached to shoe 34 at pivot point 43 projecting away from the surface of the pipe and through an opening 31 in shoe assembly mounting plate 47. Unlike the other pivot points, the connection at 43 is rigid so that rod 32 maintains a fixed relationship with shoe 34.

About rod 32 is coil spring 33 which extends between the top of shoe 34 and the underneath side of mounting plate 47. This spring biases shoe 34 toward a position where the pipe-riding flat surface 40 is parallel with the plane of mounting plate 47 and the axis of the pipe being measured.

It can be seen in FIG. 4 that when a shoe tracks the upset portion of the pipe, the shoe is canted out of its neutral alignment about pivot points 29, 30, 35 and 36. Opening 31 is large enough to allow rod 32 to move an appreciable lateral distance from the normal position of being perpendicular to the pipe axis.

Also, spring 33 allows an appreciable radial movement of shoe 34. Notice that this radial movement is only possible because pivot points 29 and 30 are located within grooves 37 and 38 of mounting block 26, rather than being fixed at one position.

Inclined surfaces 41 and 42 on shoe 34 allow the shoe to conform with the regular contours of the pipe without binding, although, as is shown in FIG. 4, the flat surface 40 is the surface that rides with the surface of the pipe at all times.

It should also be noted that the spring bias on each individual shoe is very small compared with the bias caused by spring 22 which applies pressure to centering fixtures 3.

The detecting search coil assembly 39 is located within shoe 34, as shown in FIG. 6, within a cavity in the shoe. Conductor leads 46 connect to the coil assembly and extend out through hole 45 in the side wall of the shoe. The conductors from the various shoes are channeled by convenient routes to connectors 52 attached to cage 1 at connector base plate 5. The external recording equipment is attached to the apparatus via connectors 52.

As shown in FIGS. 6 and 8, insulating material 63 completely surrounds the search coil assembly 39. The material may be rubber or other compliant material for cushioning the coil assembly against jarring, and is electrically neutral so as not to shield the coil assembly against electrical or magnetic fields.

The bottom surface 40 of the shoe that rides the pipe surface may be of a slightly harder material than the insulating material to resist wear. This material, of course, must also be electrically neutral.

Each shoe assembly mounting plate 47 has two openings 48 one located at each end of the plate for providing easy access to the assembly.

As shown in FIG. 7, there are openings in the top of the shoe for easy access to the rods, forming pivot points 35, 36 and 43. Also the end openings in the top of the shoe allow legs 27 and 28 to move freely when the shoe is canted with respect to the surface of the pipe.

The many openings in the cage, shoe assemblies, shoes and the like greatly reduce the weight of the overall apparatus from what it would be if it were made from a solid material. Also, these openings facilitate manufacture (allowing easy moulding of parts), assembly, and maintenance. To this same end, notice that legs 27 and 28 are of hollow construction, as shown in FIG. 7.

The cage may be made movable so that the shoes track the surface of the pipe in many ways. One method of moving the cage is through the use of a hand bar, a partial view of which is shown as 96, that allows a person to push the cage longitudinally with respect to the pipe axis. The groove-tracking pin 51 moves in the selected helical groove 53 to provide the helical motion.

Another method of moving the cage is shown in FIG. 11. Two hydraulic cylinders 68 and 69 are longitudinally aligned with respect to the cage and placed on opposite sides thereof. The cylinders are affixed to the cage via mounting flanges 79, which may be welded, bolted, or otherwise conveniently secured.

Since structurally cylinders 68 and 69 and their related components are essentially identical, only cylinder 68 will be discussed in detail herein.

An opening 90 in the end of cylinder 68, opposite from the end near where the measured pipe is inserted, accommodates piston rod 70. Piston rod 70 is sufficiently long to allow piston head 72 to travel the full length of hydraulic cylinder 68 without swivel connector 80, connected to piston rod 70 at its end opposite piston head 72, coming into contact with the case of cylinder 68.

Therefore, it will be seen that the longitudinal limit of cage movement is the length of hydraulic cylinder 68, since piston head 72 is free to move substantially the full length of the cylinder.

On either side of piston head 72 are gaskets 74 to form an effective seal with the inside surface of cylinder 68 so as to prevent the hydraulic fluid from escaping from one side of the piston head to the other.

Hydraulic lines for driving piston head 72 first in one direction and then in the other are connected at inlets 75 and 76. The hydraulic feed mechanism can be made to smoothly and evenly evacuate one chamber while filling the other chamber.

Swivel connector 80 is rigidly secured to piston rod 70 and allows a certain freedom of movement of the piston rod with respect to the cylinder to eliminate the possibility of binding as the rod travels its course.

Connector 80 has an internal slot 82 in its end opposite rod 70 for receiving tongue 84. Tongue 84 is pivotably fastened within slot 82 via bolt 86 and nut 87 screwed on the end thereof. There is sufficient allowance within the confines of the slot to allow tongue 84 to move freely without binding.

Support 92 is rigidly attached to tongue 84, which, in turn, is rigidly attached to the outside half of ball bearing race 94. The inside half of the race is secured to rod assembly 18.

In operation, as the cage is moved longitudinally and helically with respect to the pipe being measured, hydraulic cylinders 68 and 69 and their related components are rotated about rod assembly 18. Ball bearing race 94, attached by supports 92 and 93 to the hydraulic assemblies, allows this rotation to occur.

The advantage of using hydraulic drive for the cage as opposed to using man power, is not only in the labor saving, but the rate of travel of the coil assemblies with respect to the surface of the pipe is made more constant thereby.

The helical angle for pipe rotation can be set as steep or as shallow as desired. An angle of track of approximately 45 degrees (path angle the tracking shoes make with the surface of the pipe) has been found to be satisfactory in most applications in that this allows the coils equal opportunity to detect longitudinal as well as transverse flaws.

It will be seen that the conductors connected to connectors 52 and, when hydraulic drive is used, the hydraulic cylinders 68 and 69 will wrap around the cage as it moves over its course of travel. Since the movement is limited, intended only for inspection of a relatively short upset area, this wrapping of the lines is acceptable and not at all detrimental to successful operation.

It will also be seen that there is a certain amount of overlap between the area covered by the coils in one ring compared with the area covered by the ring of shoes adjacent to it. This provides a double measure, or back-up assurance, so necessary to keep flaws from going undetected. In addition, if the cage is moved over the area of the pipe from left to right and then from right to left, this provides yet another duplication-of-inspection coverage.

Another satisfactory embodiment of this invention is schematically represented in FIG. 10 of the drawings. As is shown, the shoe surfaces are aligned approximately parallel with the path of helical travel of the shoes to the pipe. The shoe surfaces fit snugly to the curvature of the pipe to provide uniform tracking. Of course, the shoe assemblies and the cage configurations must be adapted to accommodate shoes so aligned, but such adaptation would be readily apparent to one skilled in the art following the teachings of this patent.

Although only a few embodiments of the invention have been described, it is obvious that numerous changes can be made without departing from the scope of the invention. The limits of this invention are more clearly defined in the appended claims.

What is claimed is:

1. An apparatus for inspecting the upset area of a tubular pipe for longitudinally and transversely oriented flaws, comprising a cage capable of movement about the upset area of the pipe and spaced apart therefrom, a first ring of shoes attached to said cage spaced at intervals around the circumference of the pipe,
a second ring of shoes attached to said cage spaced at intervals around the circumference of the pipe,
each of said shoes in said first and second ring floatingly attached to said cage and positioned to contact and freely ride with the contours of the pipe,
each of said shoes comprising at least one sensing coil for detecting flaws in the pipe,
a rod, including at least one helical groove, rigidly affixed to the pipe and extending longitudinally concentric with the center bore thereof,
a connector affixed to said cage trackingly attached to said groove, and
means to move said cage helically in accordance with said groove along the pipe so that the shoes in said first and second ring rotate in a helical pattern about the surface of the pipe in overlapping relationship.

2. An apparatus for inspecting the upset area of the tubular pipe in accordance with claim 1, wherein said means includes at least one hydraulically driven piston connected to said cage for moving said cage longitudinally with respect to the pipe.

3. An apparatus for inspecting the upset area of a tubular pipe in accordance with claim 2, and further comprising
bearing means connecting said rod and said hydraulic piston for permitting helical movement of said cage and said piston.

4. An apparatus for inspecting the upset area of a tubular pipe in accordance with claim 1, wherein each of said shoes are aligned approximately parallel with said helical pattern.

5. In apparatus for inspecting the surface of a tubular member by passing an inspection means with respect thereto, the apparatus for centering the tubular member comprising
a rod adapted to pass into the center bore of the tubular member,
a conical flange concentrically centered with respect to said rod and secured thereto adapted to engage the end edge of the tubular member,
a compliant material secured to said rod adapted to be positioned within the bore of the tubular member,
means for evenly expanding said compliant material when it is located within the bore of the tubular member to secure the tubular member in a position concentric with respect to the axis of said rod, and
an external fixture centered with respect to and rigidly secured to the inspection means to flexibly and evenly engage the tubular member to hold the tubular member concentric with respect to the inspection means.

6. An apparatus for inspecting a tubular pipe having an upset area for longitudinally and transversely oriented flaws, comprising
a cage adapted to receive a plurality of rings of shoes comprising one or more search transducers, the cage being large enough in diameter to move freely about the inspected area of the pipe,
a plurality of rings of shoes attached to the cage so that the shoes of each ring are spaced at intervals around the entire circumference of the pipe, each shoe projecting inwardly from its position in said cage to ride on the surface of the pipe and float freely with the contours thereof,
a rod assembly for locating the pipe in a central position, said rod assembly extending from the center of the pipe and having a helical groove,
a tracking assembly attached to said cage and engaging said helical groove so that when said cage is moved longitudinally with respect to the pipe said cage moves in a helical manner, and
a system for moving said cage at a uniform rate with respect to the pipe.

References Cited

UNITED STATES PATENTS

| | | | |
|---|---|---|---|
| 914,743 | 3/1909 | McDonald | 269—48.1 |
| 1,166,284 | 12/1915 | Vroman | 269—48.1 |
| 2,853,773 | 9/1958 | Darasko | 269—52 |

FOREIGN PATENTS 1,156,896  12/1957  France.

RUDOLPH V. ROLINEC, *Primary Examiner.*
RICHARD B. WILKINSON, *Examiner.*
S. B. GREEN, *Assistant Examiner.*